July 11, 1967 J. R. BEDELL ETAL 3,330,032

METHOD OF PRODUCING ELECTRICAL COMPONENTS

Original Filed Jan. 17, 1962

INVENTORS
JOHN R. BEDELL
VALENTIN TSONEV
BY
Morgan, Finnegan, Durham & Pine
ATTORNEYS United States Patent Office 3,330,032

Patented July 11, 1967

3,330,032

METHOD OF PRODUCING ELECTRICAL COMPONENTS

John R. Bedell, Ridgefield, Conn., and Valentin Tsonev, La Plata, Md., assignors to Photocircuits Corporation, Glen Cove, N.Y., a corporation of New York Continuation of abandoned application Ser. No. 166,984, Jan. 17, 1962. This application Nov. 24, 1965, Ser. No. 517,877

5 Claims. (Cl. 29—598)

This is a continuation of our earlier filed application, Serial No. 166,984, filed January 17, 1962, and now abandoned.

This invention relates to methods for producing electrical components and assemblies thereof, including assemblies heretofore made by printed circuit techniques, and more particularly to multiple stage methods for forming such components and assemblies.

In the prior copending application of J. Beste for Method of Producing Electrical Components, S.N. 66,997, filed November 3, 1960, now abandoned, there is disclosed a process which includes the partial formation (as by coining) of the desired circuit configuration in a conductive material, for example a copper blank, with a residual structure or web being retained to facilitate handling and assembly; this web is subsequently dissolved away as by etching.

The present invention is related to this process, has corresponding objects and contemplates the process of supplementing the coining process described in said copending application with an embossing operation whereby the web is displaced at least partially out of the plane of the desired circuit configuration to facilitate the subsequent removal thereof by preferential web removal techniques.

To illustrate the practices of the invention, the production of rotors for electro-mechanical components will be described.

Thus, a further specific object of the invention is to provide a novel process for forming rotor components for dynamic electrical equipment such as motors, rotary switches, synchros, shaft-to-digital converters and the like.

Other objects and advantages of the invention will be set forth in part hereinafter and in part will be obvious herefrom, or may be learned by practice with the invention, the same being realized and attained by means of the instrumentalities pointed out in the appended claims.

The invention consists in the novel steps, methods, combinations and improvements herein shown and described.

Serving as exemplary illustrations of the procedures according to the invention are the drawings of which:

Figure 1:
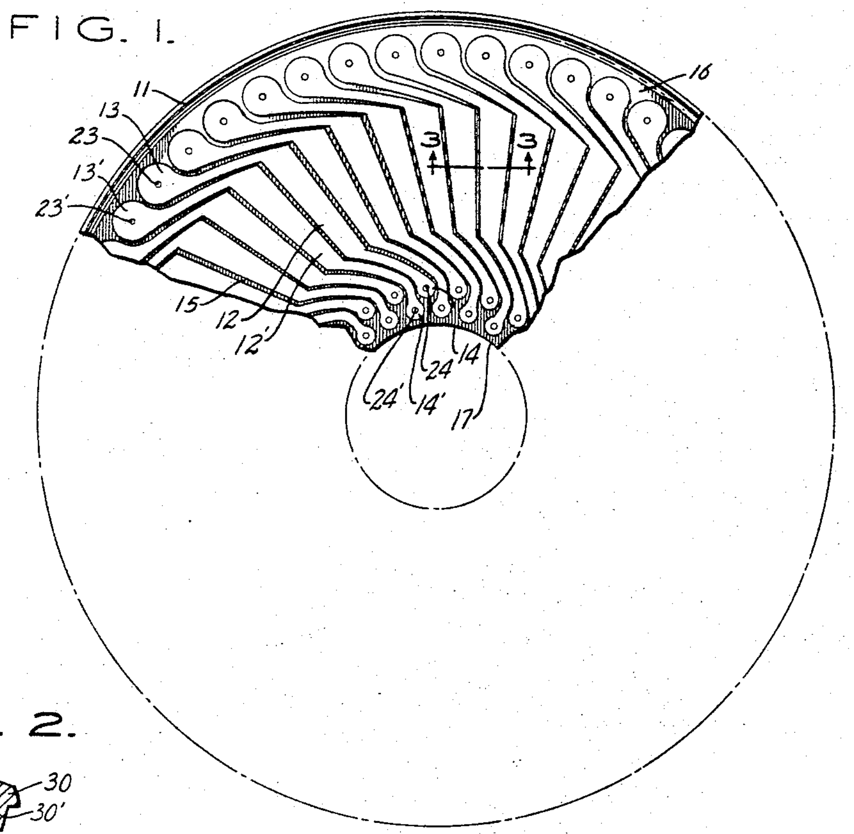
FIGURE 1 is a plan view partly schematic illustrating a partially formed electrical motor rotor.

As illustrated in FIGURE 1, a rotor produced according to the invention comprises a plurality of generally radial rotor segments 12 and 12′ arranged adjacent one another to form a generally disk-shaped configuration. Each segment 12 includes external terminal section 13 and internal terminal section 14, conveniently provided with apertures 23 and 24, respectively. In similar manner the adjacent segment 12′ is provided with external terminal section 13′ and internal terminal section 14′ having holes 23′ and 24′, respectively. To provide for economy of space and materials the terminal sections 14 of segments 12 extend to a lesser degree towards the center of the rotor than do the adjacent terminal sections 14′ of segments 12′. Rotors of this general type are disclosed in application Serial No. 792,733 filed February 12, 1959, now U.S. Patent No. 2,970,238.

Figure 2:
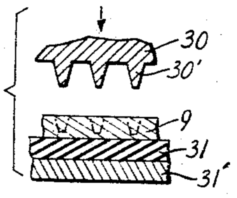
FIGURE 2 is an elevation fragmentary view in cross-section illustrating an initial state of the process wherein a conductive material or blank is subjected to pressure applied by way of a coining and embossing die.

The circuit configuration comprising the above-described plurality of conductive segments is formed from a conductive material 9, FIGURE 2, which may initially be in the form of a sheet of stock. When the blank 9 has been processed as described hereinafter, the resultant product has the appearance illustrated in FIGURE 1 with the conductive regions, e.g., segments, being formed in relief against a reduced thickness and embossed background which characterises the regions 15 between adjacent segments, as well as the central region 17 (bounded by the terminals 14, 14′) and the peripheral region 16 (between the terminal sections 13, 13′ and the external border 11). Also of reduced thickness and embossed are the regions corresponding with the holes 23, 23′, 24 and 24′.

For producing the rotor components of FIGURE 1, a coining and embossing operation illustrated in FIGURE 2 is preferably employed. In the coining and embossing operation, the blank 9 of conductive material such as copper is subjected to the action of a die 30 with a backing 31 of resilient or yieldable material and a platen 31′. When the die is operated by a press (not shown), the projections 30′ on die 30 impress the grooves 15 into the blank 9 thereby forming in relief and outlining or delineating, conductive segments 12 and 12′ against a residual background or web structure 18 of reduced thickness. Under the die pressure, the projections 30′, in cooperation with the pad 31 produce a displacement of the web sections 18 out of the plane of the conductive segments 12 and 12′.

The sections 15 as well as the other reduced and embossed sections 16, 17, etc., of the web 18 correspond with the non-conductive or dielectric sections of the circuit and these accordingly are removed prior to completion of the rotor.

It may be seen from the foregoing that the metal working processes thus far described involve a plastic working of the conductive blank above its elastic limit but below its point of ultimate shear.

Figure 3:
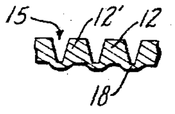
FIGURE 3 is an elevation fragmentary view in cross-section, taken along the lines 3—3 of FIGURE 1, illustrating a section of the rotor after the pressing or metal working operation.
Figure 4:
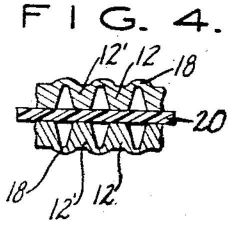
FIGURE 4 is an elevation fragmentary view in cross-section of a further stage in the process of manufacturing a rotor.

After the working operation as aforesaid, two rotor disks thus impressed (FIG. 3) are placed with their faces opposing against opposite sides of an insulator 20, the web or reduced thickness region constituting the external surface of each disk, (FIG. 4). The opposing disks are registered to form pluralities of conductor pairs which will ultimately be joined together to form the complete rotor. The performance of these steps is greatly facilitated by the structural integrity imparted to the rotor component by the web structure. Other steps which may also be performed at this time, such as trimming away surplus stock, forming center section 17, and the like, are similarly facilitated.

As seen in FIGURE 4, the mounting of each rotor component face down on opposing surfaces of the common insulator 20 results in orientation of the embossed web structure 18 on the exterior of the assembly, the grooves 15 between adjacent segments 12 and 12′ being in the interior adjacent the insulator 20.

Following this step the web is removed. The assembly may be etched by known techniques employing etchants such as ferric chloride until the residual structure 18 has been dissolved. Alternatively, the web may be removed by an eletctrolytic technique such as electro-etching or electrolytic milling or grinding, or by a simple mechanical process such as milling or grinding. Removal of the web is expedited in all these processes because of the embossed character of the web region and because of the reduced amount of copper therein. These geometric characteristics enhance the preferential removal of the web since that region can be processed without substantially disturbing the conductive segment regions.

Figure 5:
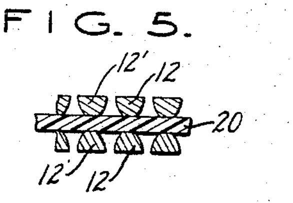
FIGURES 5 and 6 are elevation fragmentary views partly in section illustrating subsequent stages of the process of producing a rotor according to the invention.

Upon removal of section 18, each segment 12 becomes electrically separated or isolated from its adjoining segment 12′, whereby the region between the segments becomes truly dielectric or non-conductive. The result of the removal process is illustrated in FIGURE 5.

Figure 6:
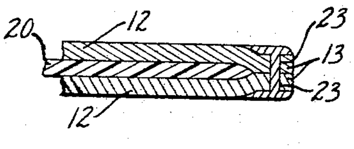

In addition to the removal of the dielectric-assigned portion of the impressed rotor disks, the segments of one disk are connected to electrically associated segments of the opposite disk to complete the circuits. This may conveniently be accomplished in a number of ways as by plating through holes 23, 23′, 24 and 24′, illustrated in FIGURE 6. The plating material as seen in that figure is in electrical contact with the adjoining terminal sections 13, passing through the coaxial holes 23 in each section. The same procedure is applied with respect to the adjacent terminal sections 13′ and the internal terminal sections 14 and 14′.

Figure 7:
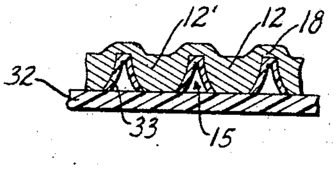
FIGURE 7 is an elevation fragmentary view partly in section illustrating a variation in the processes of the invention in larger scale.

In some cases it may be convenient to remove the dielectric sections of the impressed blank prior to permanent assembly to an insulator. In this event, the impressed pattern may be temporarily mounted and pressed face down on a suitable backing or support such as a pressure-sensitive sheet 32, FIGURE 7, thus providing means for maintaining the conductive segments in predetermined relationship after the web portion 18 has been removed.

Where removal of the web involves an etching process, it has been found that in some case the etchant prematurely gains access to a dielectric region such as the grooves 15 between the segments; the etchant attacks this region before the remainder of the web 18 has been removed. To eliminate this undercutting into the conductor segments, an etch resist 33, FIGURE 7, such as acrylic resin, may be applied to the impressed face of the circuit configuration, as by spraying.

In manufacturing rotors or other circuits according to the invention, the coining and/or embossing operation may be accomplished in a number of successive steps, each of which impresses a portion of the circuit configuration into the conductive blank, this procedure being followed until the total circuit is impressed.

It may be seen from the above that the techniques of the invention greatly facilitate the production of electrical components and assemblies. The coining and embossing operation lends itself readily to mass production and is adaptable to the working of relatively thick stock. Temporary retainer of the residual web provides important handling ease thereby also contributing to rapid and efficient production rates. Displacement of the web out of the plane of the conductor surface facilitates preferential removal thereof and thus provides a reduction in material and work losses.

The invention in its broader aspects is not limited to the specific steps, methods, combinations and improvements shown and described but departures may be made therefrom within the scope of the accompanying claims without departing from the principles of the invention and without sacrificing its chief advantages.

What is claimed is:

1. A process for the production of a current carrying assembly having a plurailty of conductive segments separated by dielectric regions, comprising the steps of placing a conductive member upon a platen having a pad of yieldable material, applying a compressive force by way of a die to preselected areas of the conductive member to impress a design delineating said conductive segments while causing said pad to yield adjacent said areas with said force controlled to leave a compressed residual and integral web structure in said member of reduced thickness bridging said conductive segments and to partially displace said web out of the plane of said conductive segments, removing the impressed conductive member from the platen pad, assembling and securing two of said impressed members in registration with impressed faces opposing to a common insulator and with residual web structures outermost, and removing the web structure on both of said members to separate said conductive segments.

2. A process according to claim 1, in which said removal step comprises the selective application of mechanical forces to said embossed regions.

3. A process according to claim 1, in which said removal of said displace regions is effected at least in part by the application of mechanical forces.

4. A process according to claim 1, in which said removal of said thickness regions comprises abrading and dissolving the same.

5. A process for the production of disk-shaped electrical rotors having a plurality of conductive segments separated by dielectric regions and wherein said segments each include a terminal, comprising the steps of placing a conductive member upon a platen having a pad of yieldable material, applying a compressive force by way of a die to preselected areas of the conductive member to impress a design delineating said conductive segments while causing said pad to yield adjacent said areas with said force controlled to leave a compressed residual and integral web structure in said member of reduced thickness bridging said conductive segments and to partially displace said web out of the plane of said conductive segments, removing the impressed conductive member from the platen pad, assembling and securing two of said impressed members in registration with impressed faces opposing to a common insulator and with residual web structures outermost, removing the web structure on both of said members to separate said conductive segments, and connecting said terminals of the segments of one impressed member to the corresponding terminals of the segments of the opposing impressed member to thereby form a plurality of electrical circuits.

References Cited

UNITED STATES PATENTS

| | | | |
|---|---|---|---|
| 2,075,286 | 3/1937 | Jackes | 29—180 |
| 2,634,495 | 4/1953 | Callsen et al. | 29—155.54 |
| 3,031,993 | 5/1962 | Gerald et al. | 75—465 XR |
| 3,148,098 | 9/1964 | Beste | 29—155.55 |

JOHN F. CAMPBELL, *Primary Examiner.*

ROBERT W. CHURCH, *Assistant Examiner.*